United States Patent [19]

Mott

[11] Patent Number: 5,201,402
[45] Date of Patent: Apr. 13, 1993

[54] SCRAPER BLADE TENSIONING DEVICE
[75] Inventor: George T. Mott, Macungie, Pa.
[73] Assignee: Asgco Manufacturing, Inc., Allentown, Pa.
[21] Appl. No.: 934,576
[22] Filed: Aug. 24, 1992
[51] Int. Cl.⁵ ............................................. B65G 45/00
[52] U.S. Cl. ................................................... 198/499
[58] Field of Search ............... 198/497, 499; 15/256.5, 15/265.51, 256.6

[56] References Cited

U.S. PATENT DOCUMENTS

| | | | |
|---|---|---|---|
| 3,631,968 | 1/1972 | Ward | 198/499 X |
| 3,656,610 | 4/1972 | McWilliams . | |
| 3,674,131 | 7/1972 | Matson . | |
| 4,036,351 | 7/1977 | Reiter . | |
| 4,189,046 | 2/1980 | Ward et al. | 198/499 |
| 4,202,437 | 5/1980 | Gordon . | |
| 4,257,517 | 3/1981 | MacPherson et al. . | |
| 4,290,520 | 9/1981 | Rhodes . | |
| 4,533,035 | 8/1985 | Reiter . | |
| 4,533,036 | 8/1985 | Gordon . | |
| 4,754,868 | 7/1988 | Hughes et al. | 198/499 |
| 4,779,716 | 10/1988 | Gordon . | |
| 4,925,434 | 5/1990 | Swinderman et al. . | |
| 4,962,845 | 10/1990 | Gibbs . | |
| 4,995,851 | 2/1991 | Taylor et al. . | |
| 5,011,002 | 4/1991 | Gibbs . | |
| 5,016,746 | 5/1991 | Gibbs . | |
| 5,065,859 | 11/1991 | Brumby . | |
| 5,117,970 | 6/1992 | Gibbs . | |

FOREIGN PATENT DOCUMENTS

| | | | |
|---|---|---|---|
| 2184084 | 6/1987 | United Kingdom | 198/499 |
| 2214480 | 9/1989 | United Kingdom | 198/499 |

Primary Examiner—D. Glenn Dayoan
Attorney, Agent, or Firm—Dann, Dorfman, Herrell and Skillman

[57] ABSTRACT

A tensioning device for adjusting the contacting/cleaning force of a scraper blade on the surface of an endless conveyor belt is provided for use on a transverse, rotatable shaft supporting the scraper blades. The tensioning device of the present invention allows the support shaft to be rotated and locked in a position which is very close to its optimum cleaning position, thereby increasing the efficiency of the scraper assembly. The present tensioning device has a pair of collars, each with a sequence of axially-directed apertures which move into and out of registry with each other as the collars are rotated. The number of and minimum distance between apertures on the two collars is calculated to provide a minimum rotational adjustment distance which is less than the minimum distance between apertures on either collar.

19 Claims, 4 Drawing Sheets

SCRAPER BLADE TENSIONING DEVICE

FIELD OF THE INVENTION

The present invention relates to a scraper blade tensioning device for adjusting the contacting force of a scraper blade on the surface of an endless conveyor belt.

BACKGROUND OF THE INVENTION

Conventional belt conveyors typically have a plurality of scraper assemblies disposed to remove deposits adhering to the surface of the conveyor belt. For example, it is common to provide a scraper assembly at or near the head pulley to clean the belt as the belt begins its return travel. Additionally, trailing arm scrapers are commonly located along the length of the belt in between the head and tail pulleys to provide additional cleaning. U.S. Pat. No. 5,016,746, assigned to ASGCO Manufacturing, assignee of the present invention, illustrates scrapers of this type.

A common type of scraper blade assembly comprises a plurality of mounted scraper blades extending across the transverse axis of the conveyor belt. The blades are mounted on support arms which are fixed to and extend from a transverse rotatable support shaft. Rotation of the transverse support shaft moves the scraper blades into and out of contact with the conveyor belt. Applying a torque to the support shaft increases the contacting force of the scraper blades against the belt.

During installation and use of the prior art scraper blade assemblies, the support shaft is torqued and locked in position when a predetermined contacting force is exerted on the belt by the scraper blades. As the scraper blades wear down, the contacting force on the belt steadily decreases, thereby reducing the cleaning efficiency of the scraper blade assembly. Over the useful life of the scraper blades, the support shaft must be adjusted several times to compensate for wear on the blades. After prolonged use, standard clamps and set screws become ineffective to maintain and adjust the contacting force.

To afford facile adjustment of the scraper blades, Gordon, U.S. Pat. No. 4,533,036 teaches a pair of adjustment collars which control the torque exerted on the shaft by a torsion tube. One collar is fixed to a torsion tube; the other collar is fixed to a transverse support shaft. Each collar is provided with a series of radial apertures which register with each other as the collars are rotated. The ends of a U-shaped link are inserted in the pair of registered holes to lock the collars relative to each other and lock the support shaft in that position. When it is desired to adjust the contacting force, the link is removed, the collars are rotated to increase the force, and then the collars are locked when the torque exerted on the support shaft by the torsion tube causes the desired contacting/cleaning force on the belt.

Optimum cleaning efficiency of the scraper assembly is highly dependent upon the magnitude of the force exerted by the scraper blade against the belt. If the contacting force is too high, the blade will wear prematurely; if the contacting force is too low, the blade will not efficiently clean the belt. Thus, the capability of the tensioning device to lock the support shaft as close as possible to its optimum cleaning position greatly affects the efficiency of the scraper blade assembly.

Using the adjustment mechanism provided by Gordon, the torsion tube is adjusted to a position which provides the optimum contacting force on the belt. However, very often in this position a pair of holes on the collars are not aligned. To properly lock the support shaft, the operator must either over-torque or under-torque the torsion tube away from the optimum cleaning position until a pair of holes on the collars are in alignment. The resultant contacting force on the belt is then either greater or less than the optimum cleaning force.

The sensitivity of the tensioning device such as that taught in Gordon depends on the minimum spacing of the radial apertures. The sensitivity of the mechanism is increased by more closely spacing the apertures on the collars; however, practical design considerations such as the collar diameter and the diameter of the apertures limit the spacing between holes around the collar, and thus, the sensitivity of the adjustment. Typical mechanical adjustment units taught in the prior art are only adjustable in increments of approximately 11.25 degrees of rotation. Often the optimum contacting/cleaning force is attained when the shaft is rotated to a position somewhere in between the 11.25 degree settings.

It is therefore an object of the present invention to provide a tensioning device which is adjustable in increments significantly less than the minimum spacing between apertures on prior art tensioners, i.e., about 11.25 degrees, preferably about 40% of the 11.25 degree spacing, and better yet about 13% of the 11.25 degree spacing.

SUMMARY OF THE INVENTION

The present invention provides a tensioning device for adjusting the contacting force of a scraper blade on an endless conveyor belt. The tensioning device of the present invention has improved sensitivity to provide more precise adjustment of the scraper blade contacting/cleaning force on the belt.

The present tensioning device has particular application to belt cleaning assemblies having a transverse, pivotally-mounted support shaft on which the cleaner blades are mounted. The tensioning device adjusts the contacting force of the blades on the conveyor belt surface by controlling the torque exerted on the rotatable shaft by a torsion bias mechanism.

The tensioning device comprises a pair of rotatable collars adjacently located on the support shaft. A tensioning collar is fixed to a torsion bias mechanism; an adjustment collar is fixed to the rotatable shaft. Each collar has a series of axial-directed apertures located at the same radius with respect to the axis of rotation. Each series, however, has a different minimum spacing between successive apertures in the series. As the collars are rotated, holes from each of the collars move into and out of registry with one another. The tensioning device is locked by inserting a lock pin in a pair of registered holes.

The holes on the collars are located in predetermined locations so that at least one pair of holes are registered each time the tensioning collar is rotated a predetermined minimum adjustment distance which is less than the minimum distance between apertures on the tensioning collar or the adjustment collar. In this manner the minimum adjustment distance and the sensitivity of the scraper assembly is not limited by the spacing of the apertures on the tensioning collar or the adjustment collar, which may be 11.25 degrees. The tensioning collar is designed with a minimum adjustment distance of approximately 4.5 degrees (about 40% of the aperture spacing) or with a minor alteration may have an adjustment distance as small as about 1.5 degrees (about 13% of the aperture spacing).

Because the tensioning device is much more sensitive than prior art tensioning devices, the position of the scraper blades after adjustment and, thus, the force exerted on the belt, is much closer to the optimum cleaning position which greatly increases the cleaning efficiency of the scraper blade assembly.

DETAILED DESCRIPTION OF A PREFERRED EMBODIMENT

Figure 1:
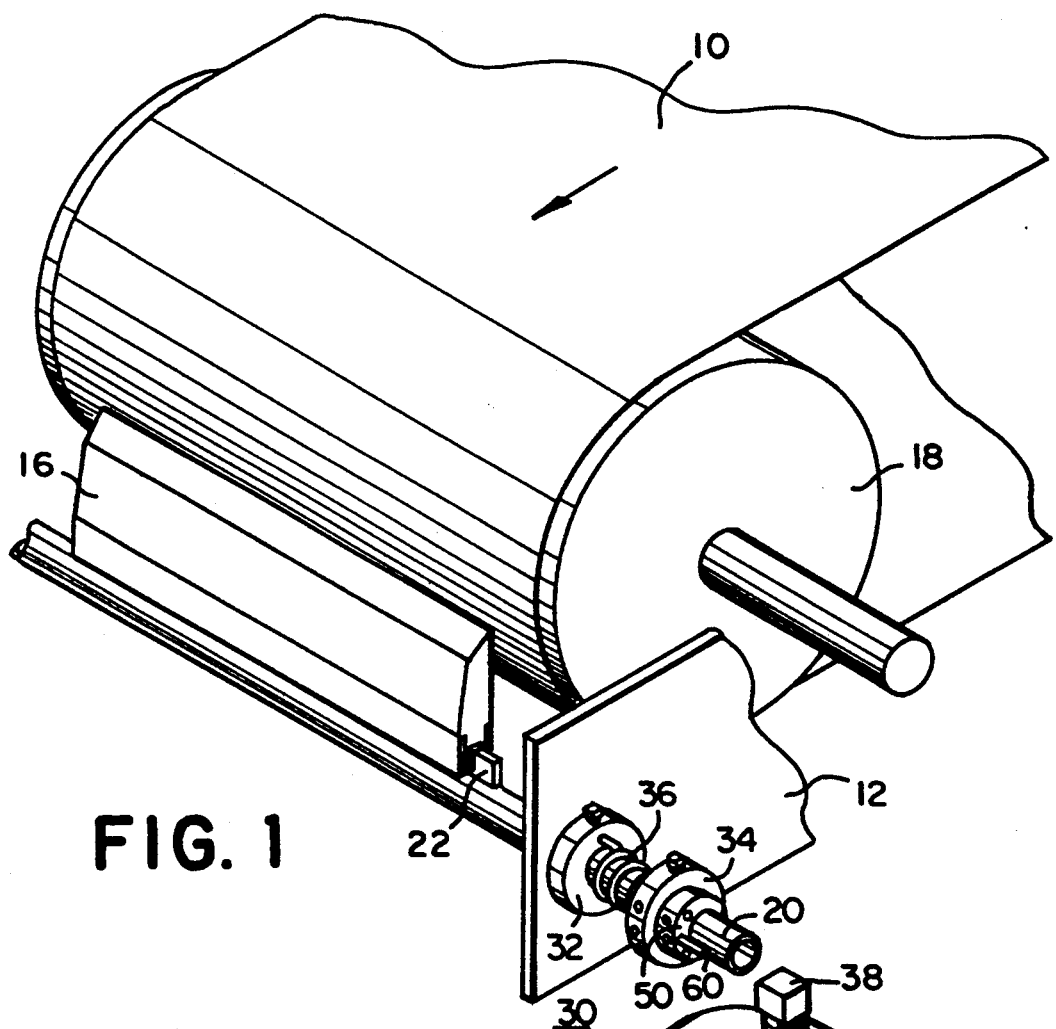
FIG. 1 is a perspective view of a conveyor belt scraping assembly installed near the head pulley of a conveyor belt and provided with a tensioning device according to one embodiment of the present invention.

Referring now to the drawings, wherein like numerals indicate like elements, shown in FIG. 1 is a conveyor belt scraper assembly fixed adjacent the head pulley 18 of an endless conveyor belt 10 running in the direction indicated by the arrow. The conveyor belt apparatus comprises a head pulley 18 mounted on a support structure 12 and a conveyor belt 10 moving in the direction shown by the arrow. The conveyor belt cleaning assembly comprises at least one scraper blade 16 mounted on a support arm 22 which is fixed to a rotatable, transverse support shaft 20. A tensioning device, denoted generally by the reference numeral 30, is provided to exert a torque on the shaft 20 which forces the scraper blade 16 into contact with the conveyor belt surface. The tensioning device 30 continuously biases the blade into contact with the belt and adjusts the position of the blade to compensate for blade wear.

Figure 2:
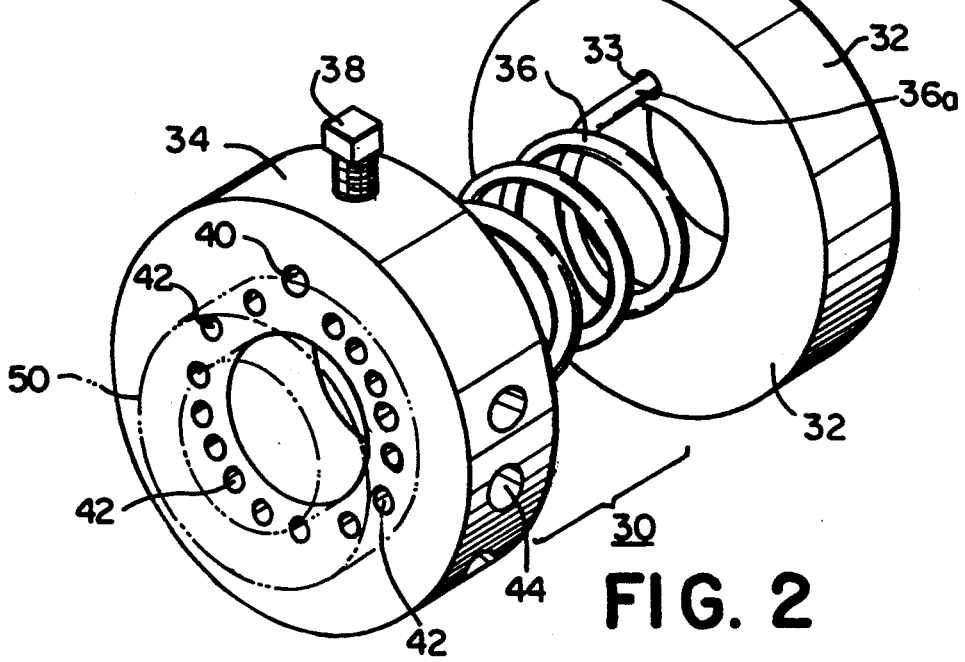
FIG. 2 is an enlarged perspective view of the tensioning device shown in FIG. 1 showing the adjustment collar in phantom to more clearly illustrate the axial apertures in the tensioning collar.

Referring to FIG. 2, the tensioning device 30 has a torsion bias mechanism which is held stationary at one end. In a preferred embodiment, the torsion bias mechanism comprises a coil spring 36 surrounding the support shaft 20. While the torsion bias mechanism may comprise a molded elastomeric material, a coil spring is preferred due to its resistance to ultraviolet deterioration. The stationary end 36a of the spring 36 is preferably fixed to the support structure 12 directly or by a clamping mechanism. In a preferred embodiment, the stationary end 36a of the spring 36 is fixed to a base collar 32 which is welded to the support structure 12. The spring end 36a is secured by a set screw 38 in an axial aperture 33 in the base collar. The base collar 32 surrounds the support shaft 20 and has a central bore which allows the shaft 20 to rotate freely. In this embodiment the base collar 32 acts as a journal for the support shaft 20.

Figure 6:
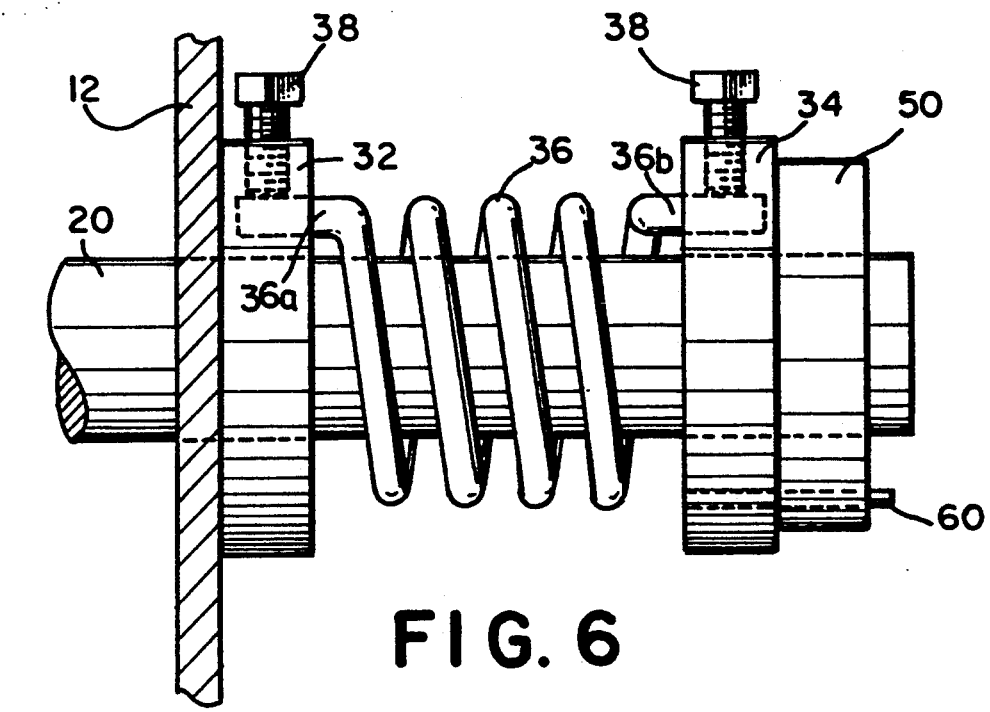
FIG. 6 is an elevational view of a preferred embodiment of the tensioning device showing the locking pin inserted in a pair of registered apertures; and, FIG. 7 is an elevational view of another embodiment of the tensioning device having an enlarged tensioning collar and adjustment collar to accommodate a lockable lock pin.

The other end of the spring 36b (see FIG. 6) is fixed to a second or tensioning collar 34. For ease of manufacturing the tensioning collar 34 and the base collar 32 are preferably about the same size but may have different diameters and/or thicknesses. Preferably the other end of the spring 36b is secured by a set screw 38 in an axial aperture 40 in the tensioning collar 34. Similarly to the base collar 32, the tensioning collar 34 surrounds the support shaft 20 and has a central bore which allows the shaft 20 to rotate freely. However, unlike the base collar 32, the tensioning collar 34 is rotatable relative to the support structure 12 and relative to the base collar 32. The torsion spring 36 is positioned on the shaft 20 in between the base collar 12 and the tensioning collar 34 and is tensioned or relaxed by relative rotation of the collars 32 and 34. Rotation of the tensioning collar 34 adjusts the bias of the torsion spring 36.

In a preferred embodiment, the tensioning collar 34 has a preselected number of equally-spaced, axially-directed apertures 42 radially located on a circle having a radius, r, measured from the axis of rotation of the tensioning collar 34 and circumferentially spaced a preselected distance a, as best seen in FIGS. 4a-f and FIG. 2. In a preferred embodiment, the tensioning collar has fifteen apertures 42 consecutively spaced in a sequence and located 22.5 degrees from each other. The spacing between the first and last axial aperture in the sequence is twice the spacing within the sequence, as seen in FIG. 2 and FIGS. 4a-f, because a different aperture 40 is needed near that location to secure the torsion spring 36.

The tensioning collar 34 cooperates with an adjacently-mounted, third collar or adjustment collar 50 to adjust the torque exerted on the shaft 20 by the torsion spring 36. The adjustment collar 50 is welded or otherwise fixed to the support shaft 20. The adjustment collar 50 is preferably smaller in diameter than the tensioning collar but may be equal or larger in diameter compared to the tensioning collar 34 or the base collar 32.

Figure 3:
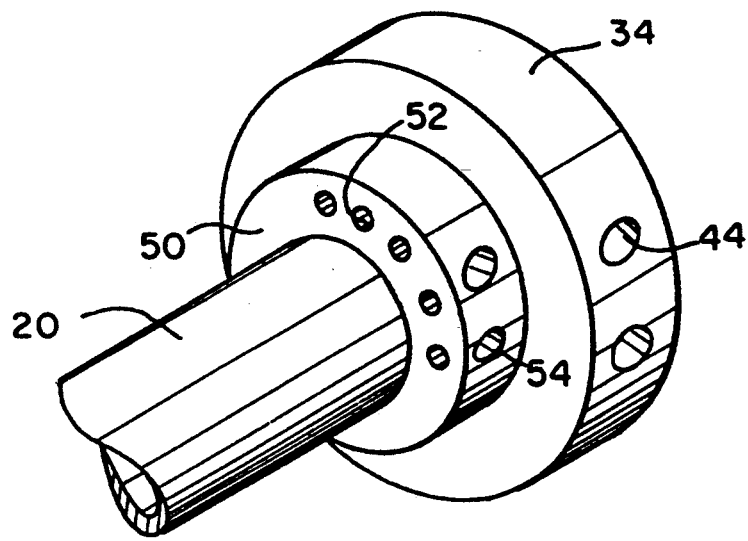
FIG. 3 is an enlarged, fragmentary view of the adjustment collar and tensioning collar shown in FIG. 1 illustrating the axial apertures in the adjustment collar.

The adjustment collar 50 preferably has a preselected number of equally-spaced, axially-directed apertures 52 radially located on a circle of radius, r, measured from the axis of rotation of the tensioning collar 34 as indicated in FIG. 3, and circumferentially spaced a preselected angular distance, b, as best seen in FIGS. 3 and 4a-4f. In a preferred embodiment, the adjustment collar has five apertures 52 consecutively spaced and located 18 degrees from each other, which spacing is 80% of the spacing between the apertures 42. The apertures 52 on the adjustment collar 50 are radially located on a circle of the same radius r, as the series of apertures 42 on the tensioning collar 34, but for the purposes of clarity of illustration, the circle of apertures 52 is on a larger radius in FIGS. 4a-4f.

Preferably, both the adjustment collar 50 and the tensioning collar 34 have at least one radially-directed aperture in the outer surface of the collar for receiving a tool such as a Spanner wrench. During installation or adjustment, a pair of tools is used, one tool used to hold the adjustment collar in a predetermined position while the tensioning collar is rotated by the other tool against the bias of the torsion spring 36 to apply the proper torque to the shaft.

The apertures in the tensioning collar 34 and the adjustment collar 50 are preferably the same size to receive a common locking pin 56 when a pair of holes (one each from the tensioning collar 34 and adjustment collar 50) are properly aligned to prevent rotation of the collars 34 and 50 relative to each other. The position of the locking pin 56 is represented by the shaded apertures in the diagrammatic illustration of FIGS. 4a-4f. Since the circumferential spacing between the adjustment collar apertures 52 and the tensioning collar apertures 42 is different, only one pair of holes are properly aligned at a time. As one of the collars is rotated, a different pair of apertures next becomes properly aligned.

As seen in FIG. 1, the axially-directed apertures on the tensioning collar 34 and the adjustment collar 50 are normal to the direction of falling debris which is scraped from the belt. Thus, due to their orientation the apertures are resistant to contamination from falling debris which could clog the apertures and make insertion of a locking pin 56 difficult.

The sequential registration of the apertures on the adjustment collar 50 and tensioning collar 34 is diagrammatically illustrated in FIGS. 4a-4f for a tensioner having an incremental adjustment c of 4.5 degrees. The inner series of holes 42 represents the series of holes 42 on the tensioning collar 34. The outer series of holes 52 represents the series of holes on the adjustment collar 50. The two sequences of holes are shown at different radii for illustration only and have the same radius r, on the tensioner in practice.

Figure 4A:
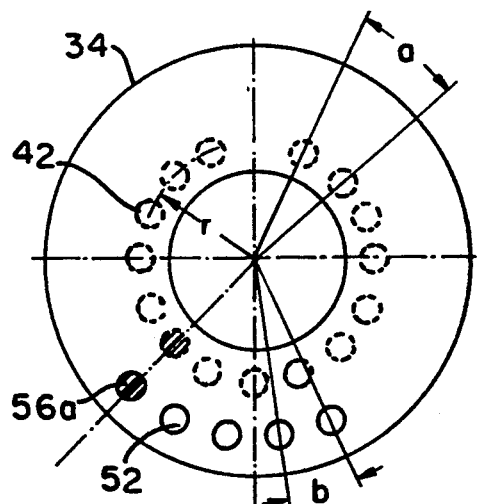
FIGS. 4a-f are diagrammatic illustrations of the rotation and alignment of the apertures in the adjustment collar and the tensioning collar.
Figure 4B:
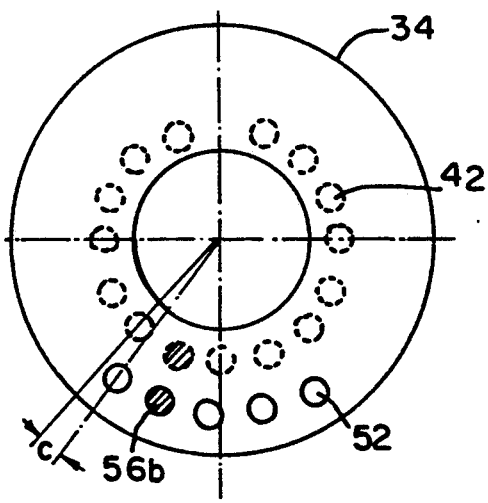
Figure 4C:
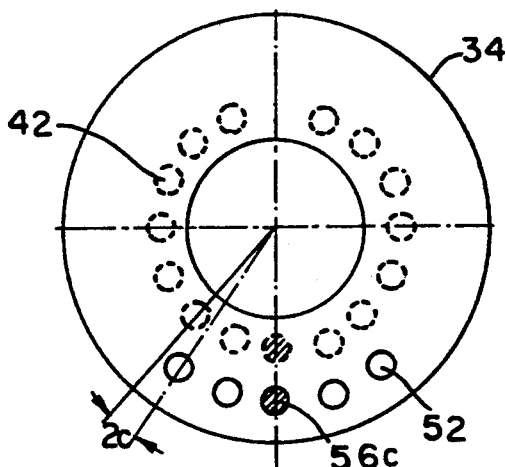
Figure 4D:
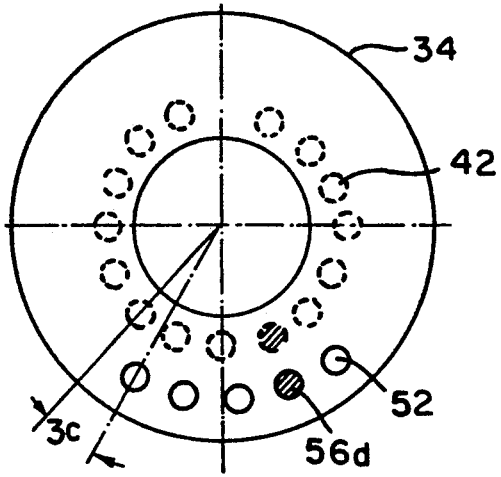
Figure 4E:
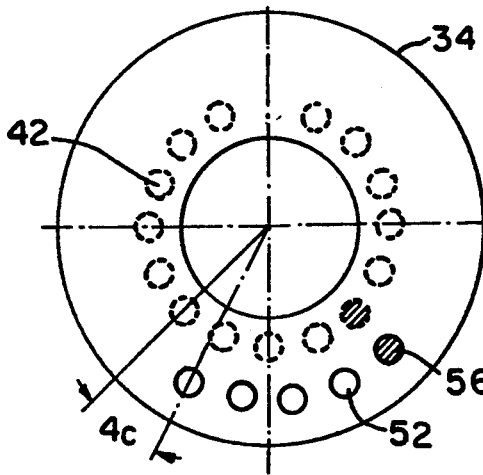
Figure 4F:
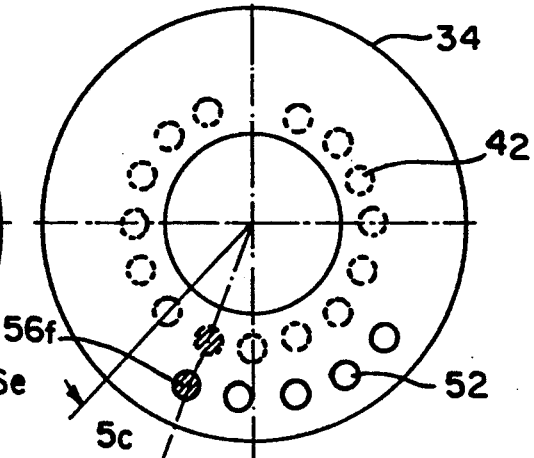

Referring to a starting position illustrated in FIG. 4a, two holes are shown aligned (cross-hatched) at 56a and are capable of receiving a common lock pin to prevent movement of the tensioning collar 34 and adjustment collar 34 relative to each other. Starting at 12:00 in the figures, the fifth aperture in the sequence 52 is registered with the tenth aperture of the sequence 42. To adjust or tighten the scraping blade, the locking pin is removed and the tensioning collar 34 is rotated an angular increment c, i.e., 4.5 degrees until the next pair of holes are properly aligned to receive the locking pin as illustrated at 56b in FIG. 4b. In this case, the fourth aperture of sequence 52 registers with the ninth aperture of sequence 42. If the tension on the scraper blade is insufficient after one increment (c) of adjustment, the adjustment collar can be rotated an additional increment (2c) until another set of apertures are aligned as illustrated at 56c in FIG. 4c. Here the third aperture of sequence 52 registers with the eighth aperture of sequence 42. FIGS. 4a-f illustrate the sequence of registry of the apertures as the adjustment is rotated through additional increments, at which point the fifth aperture of the sequence 52 once again registers or aligns with an aperture on the tensioning collar as illustrated at 56f in FIG. 4f, in this case the ninth aperture of sequence 42.

As illustrated by FIGS. 4a-f, the sensitivity of the present tensioning device is not limited by the minimum spacing between the apertures on either collar. The minimum adjustment increment of the present tensioning device is far less than minimum distance between apertures on either the tensioning collar or the adjustment collar. This increased sensitivity allows the scraper blades to be adjusted much closer to their optimum cleaning position and, thus, increases the efficiency of the scraper blade assembly.

The preferred embodiment of the tensioning device allows for adjustment in increments of 20% of the spacing between the apertures 42, i.e., 4.5°. In further embodiments, the tensioner may be designed for adjustment in even smaller increments by changing the number and spacing of the apertures on the adjustment collar.

$$Y = a/c$$

The number of apertures on the adjustment collar, Y, is calculated by dividing the desired incremental adjustment in degrees, c, into the relative spacing of the apertures on the tensioning collar in degrees, a.

$$b = a - c$$

The relative spacing of the apertures on the adjustment collar in degrees, b, is calculated by subtracting the desired incremental adjustment in degrees, c, from the relative spacing in degrees of the apertures on the tensioning collar, b.

For example, a tensioner having an incremental adjustment of 1.5 degrees and having apertures on the tensioning collar equally spaced every 22.5 degrees, requires fifteen apertures (Y=22.5/1.5) on the adjustment collar. The relative spacing of the apertures on the adjustment collar is 21° (b=22.5°-1.5°). It should be noted that 15 apertures are spaced over 315° of the circle on the adjustment collar. Using the aforementioned equations, the specific design parameters of the present tensioning device can be adjusted to accommodate various applications.

Figure 5:
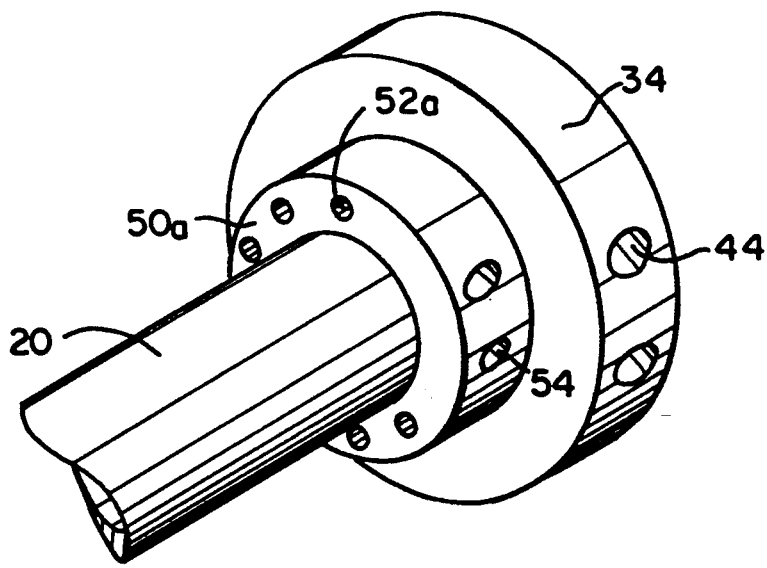
FIG. 5 is an enlarged, fragmentary view of another embodiment of the adjustment collar and tensioning collar having offset axial apertures in the adjustment collar.

In a further embodiment illustrated at 50a in FIG. 5, at least one of the apertures on the adjustment collar is offset from the consecutive series of apertures as previously illustrated. The location and spacing of the respective apertures is calculated in the same manner as the first illustrated embodiment. However, the apertures which are offset from the consecutive sequence should be offset by the distance, or a whole factor of the distance, between apertures on the tensioning collar. For example, the collar 50 having a 4.5° adjustment, has a consecutive sequence of apertures 52 located at 0°, 18°, 36°, 54°, and 72°. In this further embodiment as illustrated at 50a in FIG. 5, the second and fourth apertures 52a are offset a distance (N×a) from their original location where "N" is a whole number which is chosen to locate the offset aperture(s) in the desired location, and "a", as previously mentioned, is the distance between apertures 42 on the tensioning collar 34. Thus, location of any one of the offset apertures relative to the first or reference aperture in the series is $[(n-1) \times (a-c)] + (N \times a)$, where n is the order of the aperture in the sequence before offsetting.

In each of the aforementioned embodiments, it is preferred that the total arc required for the holes on the adjustment collar be less than 360°. Thus, Y×b should be less than 360° to avoid overlap of apertures on the adjustment collar.

From the foregoing, it is apparent that the present invention provides a simple and easy avenue for adjustment of the tension on the spring 36 and therefore the pressure of the blade 16 against the conveyor belt 10. It is anticipated that because of the ease of adjustment, there is a likelihood of unauthorized persons making adjustment in the tension without considering the critical nature of limiting the scraping force to the optimum value which assures adequate scraping of the conveyor belt and yet which does not apply such a great force as to cause premature wearing down of the blade. For example, during start-up conditions, the scraper blade may not be effective to achieve thorough cleaning of the conveyor belt until after it has been operating for a period of 15 minutes or half hour. The operator of the conveyor system in such a case may seek to adjust the force to increase the scraping action without waiting for the conveyor to achieve "steady state" conditions. Once adjusted to apply greater force, the operation of the scraper on the conveyor may cause undue wear on the scraper and even may cause damage to the conveyor belt. Thus, it is desirable to provide an embodiment of the invention where the adjustment may only be made by authorized persons.

Figure 7:
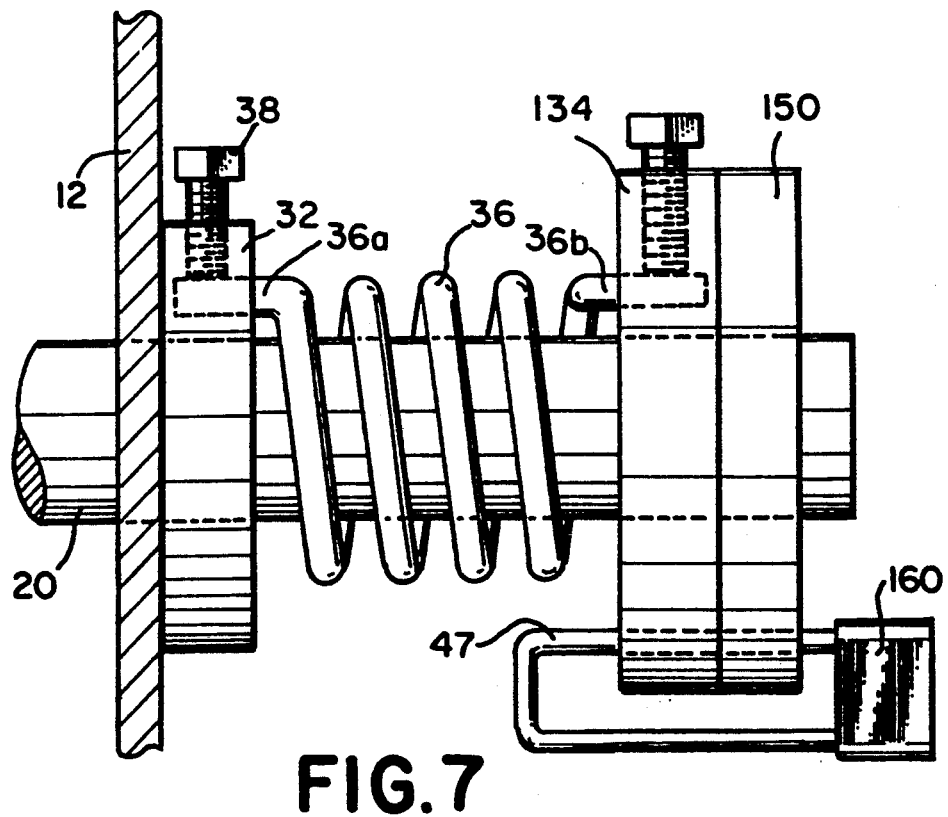

A lockable embodiment of the present tensioning device is illustrated in FIG. 7. The tensioning collar 34 of the previous embodiments is replaced with an enlarged collar 134, and the adjustment collar 50 is replaced with a collar 150 which has the same diameter as the collar 134. A lockable, lock pin 160 is provided to prevent unauthorized removal of the locking pin. The lockable, lock pin 160 may be a conventional bicycle-type lock having a long, straight shank as shown. The adjustment collar 150 and the tensioning collar 134 are preferably the same size or larger than the base collar to facilitate easy installation of the lock without interfering with the spring 36. The spring 36 is permanently fitted into the collar 134 and the collar 150 is welded to the shaft 20.

Preferably, the axial apertures pass through the entire thickness of each collar so as to facilitate forceful displacement of the lock pair 47 into and out of engagement with the aligned apertures. Preferably, the pin provides a sliding fit with the apertures and is retained by the bias of the spring 36 tending to rotate the collars. Other locking devices may be substituted, if desired.

While the aforementioned tensioning devices have been described with reference to specific mathematic equations for easily and efficiently designing a tensioning device having a predetermined minimum adjustment distance, other embodiments are possible wherein the location and number of apertures on the collars do not comport with the aforementioned equations, yet still achieve the desired result. For example, using the aforementioned design equations, the aforementioned collar having a 4.5 degree adjustment may have a consecutive series of apertures located at 0°, 18°, 36°, 54°, and 72°. Another tensioning device having a series of apertures located at 0°, 27°, 63°, 193.5°, and 211.5° would also have a minimum adjustment distance equal to 4.5 degrees.

Thus, the present invention is not limited to the particular embodiments herein illustrated and described, but changes and modifications may be made therein and thereto with in the scope of the following claims wherein the axially-directed apertures on each of the collars are positioned so that at least one pair of apertures are in alignment each time the tensioning collar is rotated a predetermined minimum adjustment distance which is less than the minimum distance between apertures on tensioning collar.

I claim:

1. A tensioning device for adjusting the contacting force of a scraper blade on the surface of an endless conveyor belt mounted in a support structure, said tensioning device comprising a transverse shaft mounted for rotation about its axis in the support structure,
   a first adjustment collar designed to receive the elongated shaft and rotatable about the axis of said shaft, said first collar having a sequence of axially-directed apertures spaced circumferentially on a circle of a given radius concentric with the axis of the shaft;
   a second adjustment collar fixed to the shaft adjacent said first collar, said second collar having a sequence of axially-directed apertures spaced circumferentially on a circle of the same radius concentric with the axis of the shaft;
   a locking pin adapted to engage in apertures of said first and second collars when said apertures are in registry;
   said axially-directed apertures of the first collar having a spacing different from the apertures on the second collar,
   said collars adapted to be rotated relative to one another in circumferential increments on said shaft axis to bring different apertures of said first and second collars into registry, said different spacing on the second collar allowing said registry when one of said collars is rotated a circumferential increment which is less than the minimum spacing between said apertures on either said first or said second collar; and
   a torsion bias mechanism fixed at one end to said support structure and fixed at the other end to said first collar to urge said first collar clockwise about said axis and through said locking pin to urge said second collar and shaft clockwise.

2. The tensioning device as recited in claim 1 wherein the number of apertures on said second collar, Y, the spacing between apertures on said first collar, a, the spacing between apertures on said second collar, b, and the circumferential increment, c, are governed by the relationships:

$$Y = a / c; \text{ and,}$$

$$b = a - c.$$

3. The tensioning device as recited in claim 2 wherein the apertures in said sequence on said first adjustment collar are equally spaced.

4. The tensioning device as recited in claim 2 wherein the apertures in said sequence on said second adjustment collar are equally spaced.

5. The tensioning device as recited in claim 2 wherein the apertures in said sequence on said second adjustment collar comprise a first sequence and at least one aperture offset from said sequence, said apertures located a distance equal to $[(n-1) \times (a-c)] + (N \times a)$ from the first aperture in said series, where n is the order of the aperture in the first sequence before offsetting, and N is a positive, whole number.

6. The tensioning device as recited in claim 1 having a lock on the locking pin to prevent unauthorized removal of the locking pin.

7. The tensioning device as recited in claim 1 wherein said first adjustment collar has at least one radially-directed aperture in the outer surface of said element for receiving a tool for exerting torque on the element against the bias of said torsion bias mechanism.

8. The tensioning device as recited in claim 6 having a third collar fixed to said support structure and arranged to receive the elongated shaft, said third collar having means to fix one end of said torsion bias mechanism to said third collar.

9. A tensioning device for adjusting the contacting force of a scraper blade on the surface of an endless conveyor belt mounted in a support structure, said tensioning device comprising a transverse shaft mounted for rotation about its axis in the support structure, and first adjustment collar dimensioned to receive the elongated shaft and rotatable about the axis of said shaft, said first collar having a sequence of axially-directed apertures spaced circumferentially on a circle of a given radius concentric with the axis of the shaft;

second adjustment collar fixed to the shaft adjacent said first collar, said second collar having a sequence of axially-directed apertures spaced circumferentially on a circle of the same radius concentric with the axis of the shaft;

a locking pin adapted to engage in apertures of said first and second collars when said apertures are in registry;

said axially-directed apertures of the second collar having an angular spacing a first percentage, P1, of the spacing of the apertures on the first collar, said collars adapted to be rotated relative to one another in circumferential increments on said shaft axis to bring different apertures of said first and second collars into registry, said different spacing on the second collar allowing said registry when one of said collars is rotated a circumferential increment which is a second percentage, P2, of the spacing between said apertures on said first collar; and a torsion bias mechanism fixed at one end to said support structure and fixed at the other end to said first collar to urge said first collar clockwise about said axis and through said locking pin to urge said second collar and shaft clockwise.

10. The tensioning device as recited in claim 9 wherein the number of apertures on said second collar, Y, the angular spacing between apertures on said first collar, a, the angular spacing between apertures on said second collar, b, and the circumferential angular increment, c, are governed by the relationships:

$$Y = a/c; \text{ and,}$$

$$b = a - c.$$

11. The tensioning device as recited in claim 9 wherein the apertures in said sequence on said first adjustment collar are equally spaced.

12. The tensioning device as recited in claim 10 wherein the apertures in said sequence on said second adjustment collar are equally spaced.

13. The tensioning device as recited in claim 10 wherein the apertures in said sequence on said second adjustment collar comprise a first sequence and at least one aperture circumferentially offset from said sequence, said apertures located a distance equal to $[(n-1) \times (a-c)] + (N \times a)$ from the first aperture in said series, where n is the order of the aperture in the first sequence before offsetting, and N is a whole number.

14. The tensioning device as recited in claim 9 wherein $(Y-1) \times b$ is less than a full circle.

15. The tensioning device as recited in claim 9 wherein P1 equals about 80% and P2 equals about 20%.

16. The tensioning device as recited in claim 9 wherein P1 equals about 93% and P2 equals about 7%.

17. The tensioning device as recited in claim 9 having a lock on the locking pin to prevent unauthorized removal of the locking pin.

18. The tensioning device as recited in claim 9 wherein said first adjustment collar has at least one radially-directed aperture in the outer surface of said collar for receiving a tool for exerting torque on the element against the bias of said torsion bias mechanism.

19. The tensioning device as recited in claim 9 having a third collar fixed to said support structure and arranged to receive the elongated shaft, said third collar having means to fix one end of said torsion bias mechanism to said third collar.

* * * * *

UNITED STATES PATENT AND TRADEMARK OFFICE
CERTIFICATE OF CORRECTION

PATENT NO. : 5,201,402

DATED : April 13, 1993

INVENTOR(S) : George T. Mott

It is certified that error appears in the above-identified patent and that said Letters Patent is hereby corrected as shown below:

Column 6, line 54, "where n" should be --where "n"--;

Column 7, line 25, after "shank" insert --47--;

line 31, after "shaft 20." insert --The collars are provided with radially-directed apertures (not shown) similar to the apertures 44 and 54 shown in Figs. 3 and 5.--;

line 34, "pair 47" should be --shank 47--;

line 35, after "apertures." insert --The axial apertures (not shown) in the two collars 134 and 150 are angularly spaced like the apertures 42 and 52 or 52a on circles of equal radius.--.

Signed and Sealed this

Third Day of May, 1994

*Attest:*

BRUCE LEHMAN

*Attesting Officer*    Commissioner of Patents and Trademarks